(12) United States Patent
Pazdernik

(10) Patent No.: US 8,448,777 B2
(45) Date of Patent: May 28, 2013

(54) METHODS AND APPARATUS FOR SLIP SHEET METERING FOR INDEXING PRODUCT

(75) Inventor: Irvan Leo Pazdernik, Alexandria, MN (US)

(73) Assignee: Douglas Machine Inc., Alexandria, MN (US)

( * ) Notice: Subject to any disclaimer, the term of this patent is extended or adjusted under 35 U.S.C. 154(b) by 328 days.

(21) Appl. No.: 12/993,263

(22) PCT Filed: May 18, 2009

(86) PCT No.: PCT/US2009/044298
§ 371 (c)(1),
(2), (4) Date: Nov. 18, 2010

(87) PCT Pub. No.: WO2009/143042
PCT Pub. Date: Nov. 26, 2009

(65) Prior Publication Data
US 2011/0067975 A1    Mar. 24, 2011

Related U.S. Application Data

(60) Provisional application No. 61/054,234, filed on May 19, 2008.

(51) Int. Cl.
*B65G 47/08*    (2006.01)
(52) U.S. Cl.
USPC .................. 198/460.2; 198/461.3; 198/418.6; 198/419.2
(58) Field of Classification Search
USPC ................ 198/418.6, 419.1, 426, 429, 460.2, 198/461.1, 461.2, 600
See application file for complete search history.

(56) References Cited

U.S. PATENT DOCUMENTS

| | | | |
|---|---|---|---|
| 4,238,024 A | 12/1980 | Hirakawa et al. | |
| 4,960,198 A * | 10/1990 | Hogenkamp | 198/419.2 |
| 4,961,488 A * | 10/1990 | Steeghs | 198/357 |
| 6,843,360 B2 * | 1/2005 | Peterman et al. | 198/429 |
| 7,185,752 B2 * | 3/2007 | Hakansson | 198/419.1 |
| 7,222,716 B2 * | 5/2007 | Peterman et al. | 198/419.3 |
| 7,533,768 B2 * | 5/2009 | Floding et al. | 198/419.3 |
| 7,726,463 B2 * | 6/2010 | Aronsson | 198/419.3 |
| 7,874,417 B2 * | 1/2011 | Oppici | 198/419.3 |
| 8,011,495 B2 * | 9/2011 | Anderson et al. | 198/419.2 |
| 8,113,335 B2 * | 2/2012 | Aronsson et al. | 198/419.3 |

\* cited by examiner

*Primary Examiner* — Patrick Mackey
(74) *Attorney, Agent, or Firm* — Alan Kamrath; Kamrath IP Lawfirm, P.A.

(57) ABSTRACT

Product is conveyed as a continuous stream by a meter conveyor (12) unto a transfer plate (32) and a transfer device (42) including first and second supports (42A, 42B) each in the form of a thin piece of flexible material. The transfer device (42) is movable between retracted and extended positions extending over a sweep conveyor (22) by securing its trailing and leading ends to flexible belts (106, 206) on opposite longitudinal sides of the sweep conveyor (22). Product is transferred from the second support (42B) to the sweep conveyor (22) and from the first support (42A) to the second support (42B) as the transfer device (42) moves from the extended position to the retracted position and is engaged by a metering bar (52B) which controls the product acceleration on the sweep conveyor (22) and by a metering bar (52A) which prevents unmetered product from tipping downstream. A sweep bar (62*a*) which collects the product on the sweep conveyor (22).

22 Claims, 4 Drawing Sheets

US 8,448,777 B2

METHODS AND APPARATUS FOR SLIP SHEET METERING FOR INDEXING PRODUCT

BACKGROUND

The present invention generally relates to apparatus and methods for metering product from a continuous stream into a product group and/or pack pattern, particularly to metering apparatus and methods not requiring windows between product in the continuous stream, more particularly to metering apparatus and methods which are versatile to meter a wide variety of product such as cans, plastic bottles, jars, cartons, bundles, or trays, and specifically to metering apparatus and methods where product is metered by moving a transfer device from underneath a product group positioned above a sweeping conveyor.

Furthermore, the present invention relates to a metering bar mechanism for registering the leading edge of the product group on the transfer device, with such metering bar mechanism also preventing tipping of tall and/or unstable products. Also, the present invention relates to the metering bar mechanism abutting with the trailing edge of the product group moving onto a sweep conveyor.

In a typical packaging operation, product comes to a packaging machine in a continuous stream. It is necessary to separate product into groups so that they can be further processed such as being placed into a pack pattern and/or packed into a film overwrap or a corrugated wrap. U.S. Pat. No. 6,843,360 represents one manner of metering product which has enjoyed considerable market success.

However, a need continues to exist for apparatus and methods for metering product which do not suffer from the deficiencies of prior metering apparatus and methods.

SUMMARY OF THE INVENTION

The present invention solves this need and other problems in the field of metering products by providing, in a preferred first aspect, methods and apparatus for moving a transfer device in the form of first and second supports between extended and retracted positions relative to a conveyor, with the transfer device being moved independently of the conveyor in the preferred form shown. Specifically, product previously on the second support are deposited on the conveyor and product on the first support are deposited on the second support when the transfer device is moved from the extended position to the retracted position. By moving the second support faster towards the extended position, a gap is created between product on the second support and on the first support.

In another preferred aspect of the present invention, a pair of metering bars are simultaneously introduced into the gap created while the first and second supports are moving to the extended position. The leading and trailing edges of product are abutted by the pair of metering bars when the first and second supports are retracted to their retracted position, with the pair of metering bars independently moving along the same endless path relative to a conveyor.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
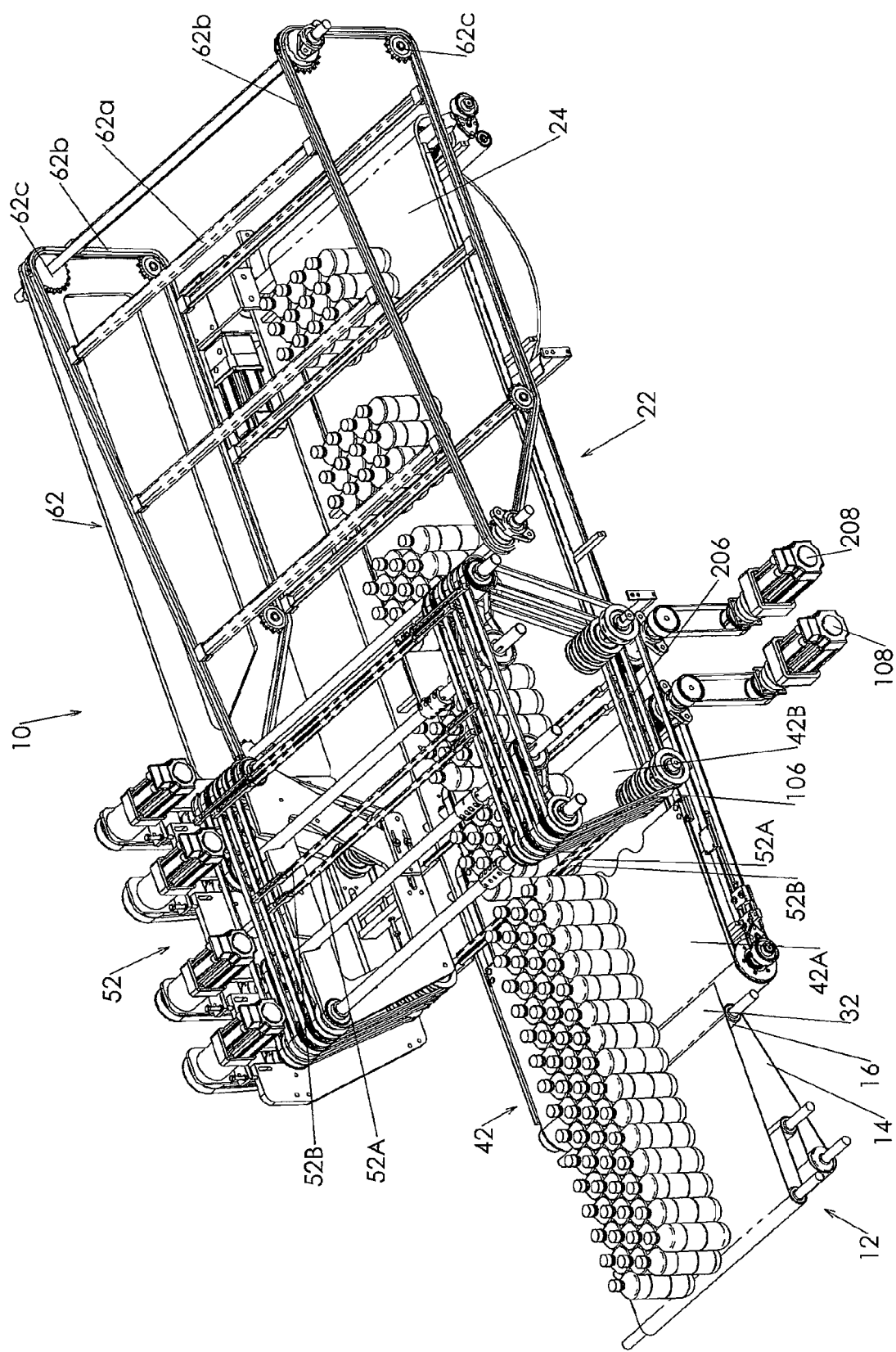
FIG. 1 shows a partial, perspective view of a metering apparatus utilizing preferred methods according to the preferred teachings of the present invention, with portions being removed to show constructional details.
Figure 2:
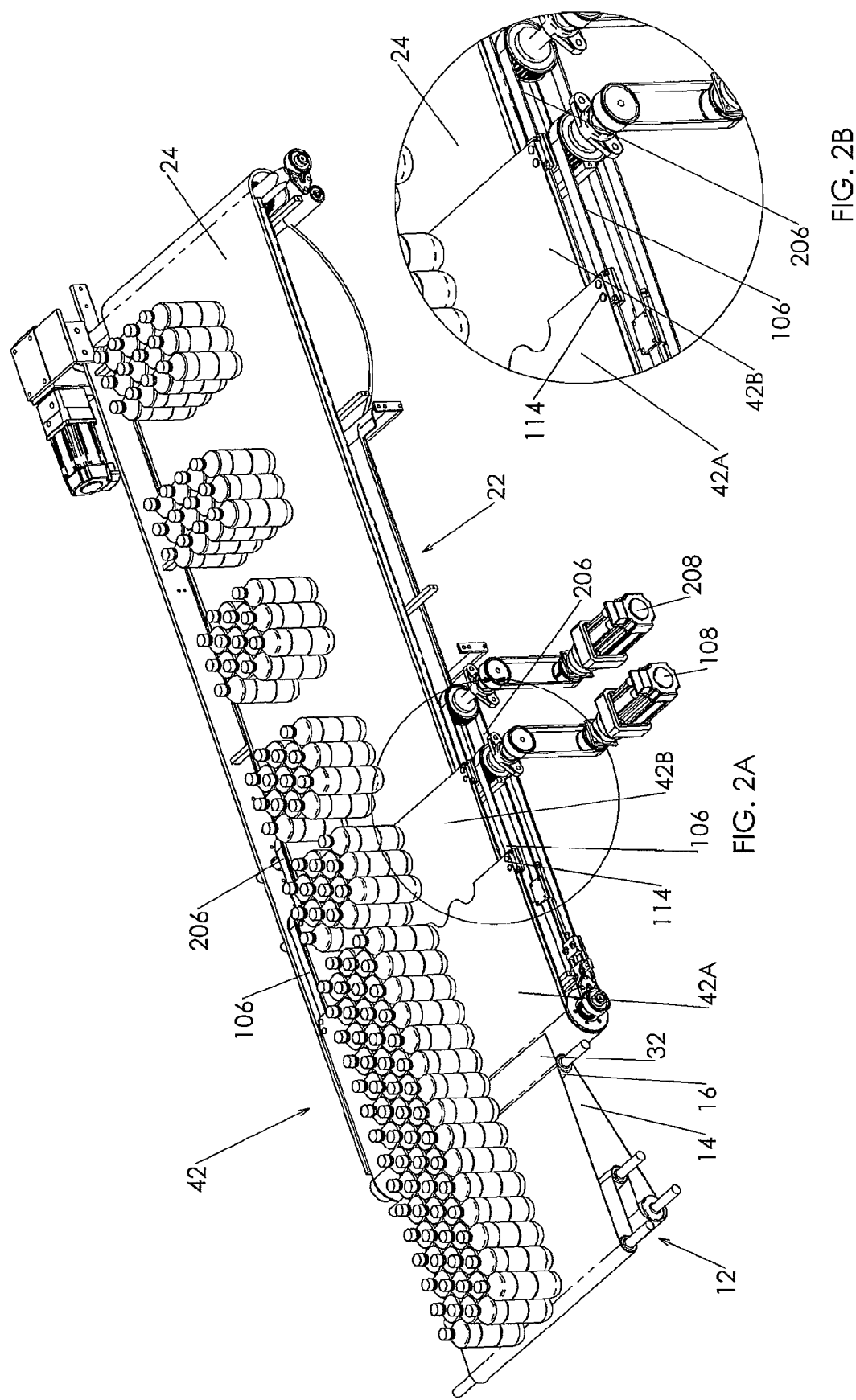
FIG. 2A shows a perspective view of the metering apparatus of FIG. 1 with the control device and sweep mechanism removed to show constructional details.
FIG. 2B shows an enlarged perspective view of the area encircled in FIG. 2A.
Figure 3:
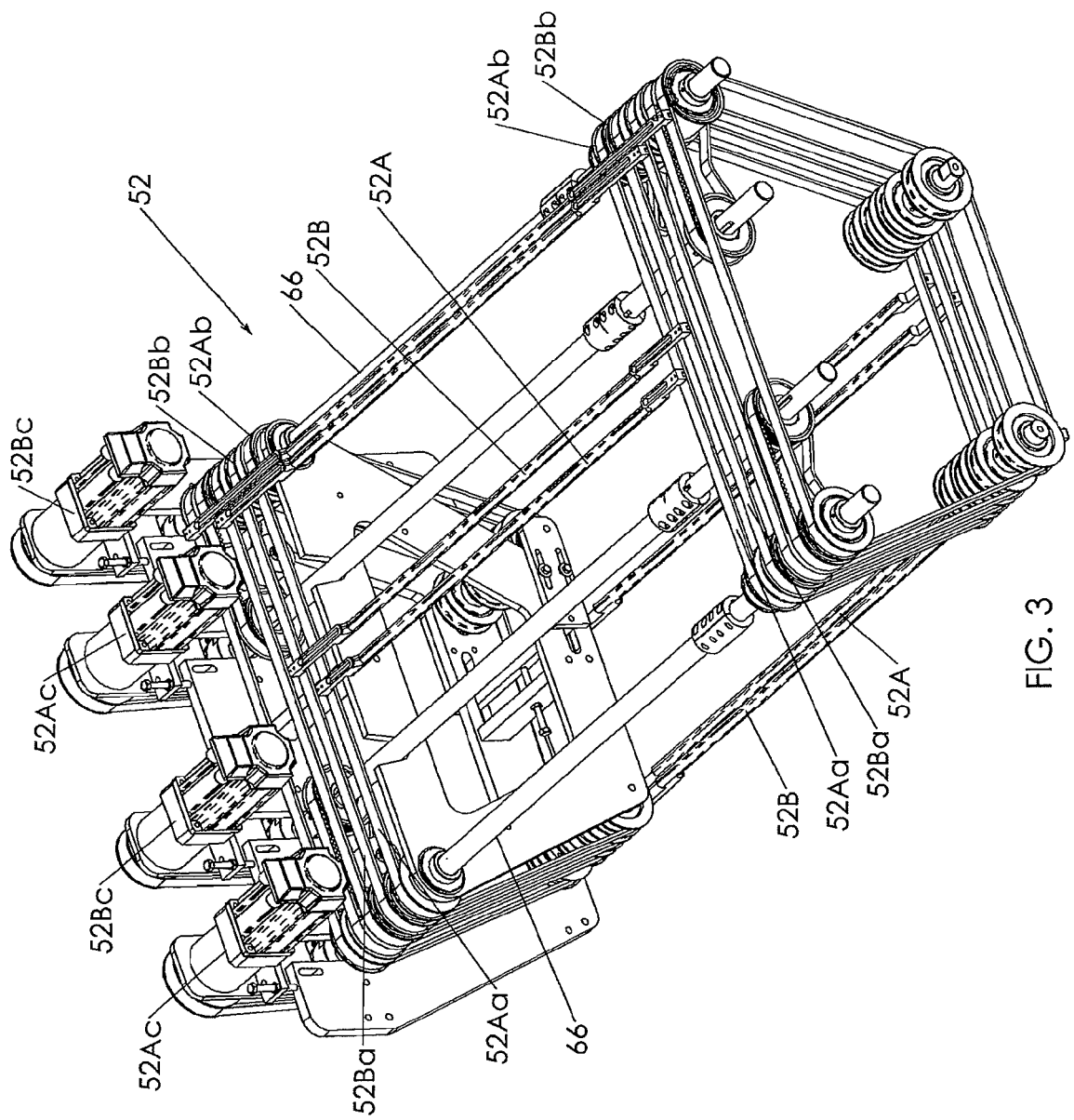
FIG. 3 shows a perspective view of the control device of the metering apparatus of FIG. 1.
Figure 4:
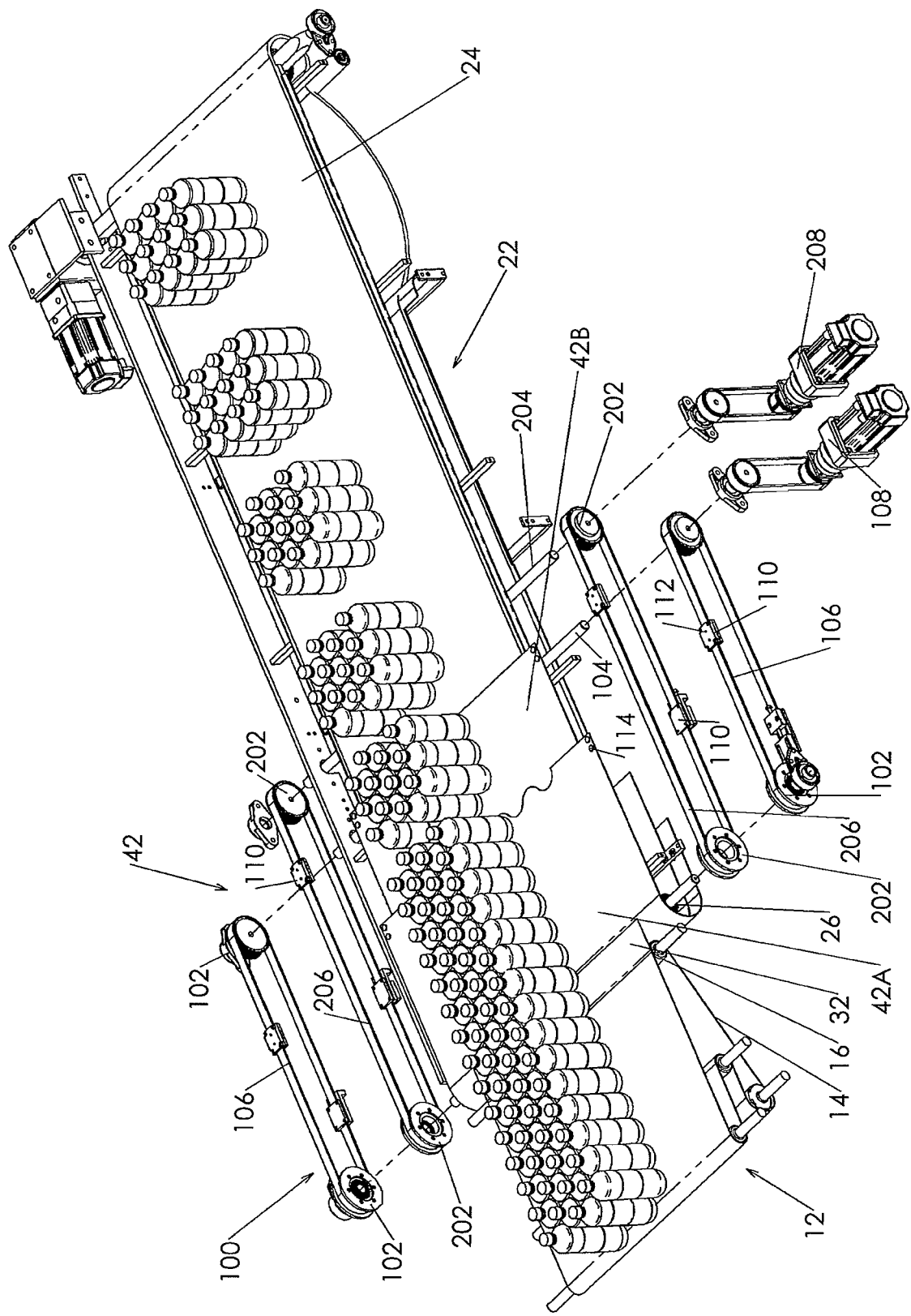
FIG. 4 shows an exploded perspective view of the metering apparatus as shown in FIG. 2A.

All figures are drawn for ease of explanation of the basic teachings of the present invention only; the extensions of the figures with respect to number, position, relationship, and dimensions of the parts to form the preferred embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "side," "end," "bottom," "first," "second," "laterally," "longitudinally," "row," "column," and similar terms are used herein, it should be understood that these terms have reference only to the structure shown in the drawings as it would appear to a person viewing the drawings and are utilized only to facilitate describing the illustrative embodiments.

DESCRIPTION OF THE PREFERRED EMBODIMENTS

An apparatus for metering product and in particular to apparatus which collates and separates groups of product in preparation for various types of packaging of the most preferred form is shown in the drawings and generally designated 10. Generally, apparatus 10 includes first and second product conveyance mechanisms which are independently driven for moving product in a conveying direction. In the most preferred form, the conveying direction of the first and second product conveyance mechanisms are collinear to each other, with the product being transferred from the first product conveyance mechanism where they are bunched together unto the second product conveyance mechanism where they are separated, typically into groups. However, it should be recognized that the first and second product conveyance mechanisms could have other arrangements including linearly parallel, perpendicular or at a nesting angle of nested product. In the most preferred form, the first product conveyance mechanism is shown as a meter conveyor 12 which is driven at variable speeds such as by a servo motor. In the preferred form, conveyor 12 includes an endless belt 14 including an upper run extending between and moving in the conveying direction from an upstream roller at an upstream end and a downstream roller 16 at a downstream end. The endless belt 14 also includes a lower run extending between and moving from the downstream end to the upstream end. It should be realized that conveyor 12 can include one or more additional rollers, with one or more of the rollers 16 being rotated such as by a servo motor to cause movement of belt 14.

In the most preferred form, the second product conveyance mechanism is shown as a sweep conveyor 22 which is separately driven from conveyor 12 and typically in a continuous manner such as by a servo motor. In the preferred form, conveyor 22 includes an endless belt 24 including an upstream end and a downstream end and having an upper run extending between an upstream roller 26 defining the upstream end and a downstream roller. The upper run moves from the upstream end to the downstream end in the conveying direction, and the lower run moves from the downstream end to the upstream end, with at least a portion of the lower run being parallel to and spaced below the upper run. It should be realized that conveyor 22 can include one or more additional rollers, with one or more of the rollers 26 being rotated such as by a servo motor to cause movement of belt 24. In the most preferred form, the upper runs of belts 14 and 24 are in the same plane, and possibly the upper run of belt 24 being parallel to but slightly lower than the upper run of belt 14.

Due to the circular cross sections of rollers 16 and 26 in the most preferred form, a gap is created between belts 14 and 24. In the preferred form, a flat, stationary transfer plate 32 extends between the upper runs of belts 14 and 24 generally between the mid point of rollers 16 and 26. Thus, lead product is pushed by the continuous stream being advanced by conveyor 12 onto and past transfer plate 32 in a manner described hereinafter.

Apparatus 10 according to the teachings of the present invention includes a product transfer device 42 upon which product is supported and in the preferred form has an upper surface of a size upon which the bottom of the product is supported and in the most preferred form to receive product having multiple rows and multiple columns. Transfer device 42 is moveable relative to conveyor 22 between an extended position and a retracted position. Device 42 extends over conveyor 22 in the extended position and in the preferred form also extends over conveyor 22 beyond transfer plate 32 in the retracted position.

According to the teachings of the present invention, device 42 includes a first support 42A which overlays a second support 42B, with second support 42B intermediate first support 42A and conveyor 22 and with the leading end of first support 42A located intermediate the upstream end of conveyor 22 and the leading end of the second support 42B. In the most preferred form, first and second supports 42A and 42B are in the form of thin pieces of flexible material such as a belt requiring external support to allow product to be supported thereon. Thus, in the preferred form, device 42 in the form of thin pieces of material engages and is supported by belt 24 to allow product to be supported upon device 42.

In the preferred form shown, apparatus 10 further includes a slip sheet drive 100. In particular, drive 100 includes first and second drive pulleys 102 on opposite sides of roller 26 and which are rotatable relative to roller 26. In this regard, roller 26 could be rotatable relative to a common axle defining the rotation axis of the semicircular portion of belt 24 of the upstream end whereas pulleys 102 could be rotatable relative to or rotatably fixed to the common axle, or pulleys 102 could be rotatable relative to the common axle whereas roller 26 could be rotatable relative to or rotatably fixed to the common axle. Drive 100 further includes a drive shaft 104 parallel to but spaced downstream of roller 26, pulleys 102, and their common axle, with drive shaft 104 located between the upper and lower runs of belt 24. First and second, flexible, gear belts 106 extend along an endless course between drive shaft 104 and pulleys 102 and on opposite longitudinal sides of sweep conveyor 22 and parallel to the conveying direction. It should be appreciated that either pulleys 102 or drive shaft 104 or both can be driven such as by a servo motor 108.

The trailing and leading ends of first support 42A are suitably removably fixed at first and second leading points adjacent to the leading end and at first and second trailing points adjacent to the trailing end to gear belts 106, with the first and second leading points being spaced from the first and second trailing points and with the first and second longitudinal sides of conveyor 22 being intermediate the first and second leading points and intermediate the first and second trailing points. In the preferred form shown, each of gear belts 106 includes attachment plates 110 including an array of protrusions 112 extending outwardly thereof. The corners of the trailing and leading ends of first support 42A includes an interconnect 114 having a lower surface which removably receives one or more protrusions 112 to secure first support 42A to and between gear belts 106. It should be appreciated that both trailing and leading ends of first support 42A are attached to gear belts 106 enabling positive movement both upstream and downstream.

Additionally, drive 100 includes first and second drive pulleys 202 on opposite sides of roller 26 and which are rotatable relative to roller 26. In this regard, roller 26 could be rotatable relative to a common axle defining the rotation axis of the semicircular portion of belt 24 of the upstream end whereas pulleys 202 could be rotatable relative to or rotatably fixed to the common axle, or pulleys 202 could be rotatable relative to the common axle whereas roller 26 could be rotatable relative to or rotatably fixed to the common axle. In the most preferred form shown, pulleys 202 are located intermediate roller 26 and pulleys 102. Drive 100 further includes a drive shaft 204 parallel to but spaced downstream of roller 26, pulleys 102, 202, and their common axle, with drive shaft 204 located between the upper and lower runs of belt 24. First and second, flexible, gear belts 206 extend along an endless course between drive shaft 204 and pulleys 202 and on opposite longitudinal sides of sweep conveyor 22 and parallel to the conveying direction. It should be appreciated that either pulleys 202 or drive shaft 204 or both can be driven such as by a servo motor 208.

The trailing and leading ends of second support 42B are suitably removably fixed at first and second leading points adjacent to the leading end and at first and second trailing points adjacent to the trailing end to gear belts 206, with the first and second leading points being spaced from the first and second trailing points and with the first and second longitudinal sides of conveyor 22 being intermediate the first and second leading points and intermediate the first and second trailing points. In the preferred form shown, each of gear belts 206 includes attachment plates 110 including an array of protrusions 112 extending outwardly thereof. The corners of the trailing and leading ends of second support 42B includes an interconnect 114 having a lower surface which removably receives one or more protrusions 112 to secure second support 42B to and between gear belts 206. It should be appreciated that both trailing and leading ends of second support 42B are attached to gear belts 206 enabling positive movement both upstream and downstream.

Transfer device 42 is moved from its retracted position to its extended position with the leading ends of supports 42A and 42B having a greater spacing from the upstream end of conveyor 22 in the extended position than in the retracted position. Specifically, in the preferred form shown, transfer device 42 is moved independently of conveyor 22 by driving the upper runs of belts 106 and 206 in the same direction as the conveying directions of conveyors 12 and 22 to pull on the leading ends of first and second supports 42A and 42B. In the retracted position, the leading end of second support 42B is spaced in the conveying direction the length of one product pattern beyond the leading end of first support 42A. When transfer device 42 moves from its retracted position, first support 42A moves in the conveying direction of conveyors 12 and 22 and in the most preferred form at the speed of conveyor 12, while the second support 42B moves faster than first support 42A to create a gap between the leading edge of first support 42A and the trailing edge of one product pattern supported upon second support 42B. Thus, the leading end of second support 42B is spaced in the conveying direction from the leading end of first support 42A in the extended position greater than the length in the retracted position. After the gap has been created, first and second supports 42A and 42B are retracted opposite to the conveying direction of conveyors 12 and 22, with second support 42B moving faster than first support 42A towards the retracted position such that the leading ends of first and second supports 42A and 42B are spaced the length of one product pattern when transfer device 42 reaches its retracted position.

First and second supports 42A and 42B are moved from the extended position by driving the lower runs of belts 106 and 206 in the same direction as the conveying directions of conveyors 12 and 22 to pull on the trailing ends of first and second supports 42A and 42B. The leading ends of first and second supports 42A and 42B located in the conveying direction are at a greater spacing from the upstream end in the extended position than in the retracted position. It should be appreciated that although drive 100 of the preferred form shown is advantageous and produces synergistic results, it should be appreciated that transfer device 42 can be positively moved by securing the trailing and leading ends to drives of other forms and types according to the teachings of the present invention. Likewise, one or both of first and second supports 42A and 42B could be moved by pulling on the upstream ends thereof, such as by being wrapped around a roller and moving from the retracted position to the extended position as a result of friction.

Apparatus 10 according to the teachings of the present invention further includes a control device for registering the leading edge of the product group on transfer device 42 in its extended position. In the most preferred form, the control device is in the form of a metering bar mechanism 52. Metering bar mechanism 52 generally includes a plurality of pairs of metering bars 52A and 52B extending laterally across sweep conveyor 22. Each pair of metering bars 52A and 52B are carried along an endless path such as by belts, chains or other flexible transmission devices 52Aa and 52Ba extending over pulleys 52Ab and 52Bb and in the shape of the endless path parallel to the conveying direction. Conveyor 22 is located intermediate transmission devices 52Aa and 52Ba.

In the most preferred form shown, the plurality of pairs of metering bars 52A and 52B occupy the same operational footprint and space in apparatus 10. In particular, pulleys 52Ab and 52Bb include common axles 66 each defining an axis, with four such common axles 66 being shown defining a generally trapezoid cross sectional shaped endless path. In this regard, on one or more but not all of axles 66, pulleys 52Ab are rotatably fixed to the common axle 66 which is driven such as by a servo motor 52Ac, whereas pulleys 52Bb are rotatable with respect to such axle 66. Another one or more but not all of axles 66, pulleys 52Bb are rotatably fixed to the common axle 66 which is driven such as by a servo motor 52Bc, whereas pulleys 52Ab are rotatable with respect to such axle 66. In the preferred form, transmission device 52Aa and pulleys 52Ab are located inwardly of transmission device 52Ba and pulleys 52Bb. Metering bars 52A are connected between and driven by devices 52Aa but do not engage with or are connected to devices 52Ba. Bars 52B are connected between and driven by devices 52Ba and extend over devices 52Aa but are not connected to devices 52Aa. It should be appreciated that although the manner of moving bars 52A and 52B is believed to be advantageous and produces synergistic results, it should be appreciated that bars 52A and 52B can be moved in other manners according to the teachings of the present invention. Additionally, in a portion of the path, metering bars 52B move in the conveying direction of conveyor 22 at least initially at the conveyance speed of conveyor 12. Generally, the leading edge of product on transfer device 42 abuts against a respective metering bar 52B which may serve to prevent tipping of the product upon sweep conveyor 22 as well as to physically restrain product on transfer device 42. Likewise, in a portion of the path, metering bars 52A move in the conveying direction of conveyor 22 at the conveyance speed of conveyor 12. Generally, the trailing edge of product on second support 42B abuts against a respective metering bar 52A which contains the pattern and positively positions the product pattern on the sweep conveyor 22.

In the preferred form shown, apparatus 10 further includes a mechanism 62 which collects product together and delivers the product to the next appropriate packaging function such as film overwrap or corrugated wrap in a finished form. In the most preferred form, mechanism 62 is a sweeping bar mechanism generally including a plurality of sweep bars 62a extending laterally across sweep conveyor 22 and which are carried along an endless path such as by belts, chains or other flexible transmission device 62b extending over pulleys 62c in the shape of the endless path and independently of the plurality of pairs of metering bars 52A and 52B. Generally, sweep bar mechanism 62 introduces sweep bar 62a between product on sweep conveyor 22 for abutting with the trailing edge of product on sweep conveyor 22.

Now that the basic construction of apparatus 10 according to the preferred teachings of the present invention has been set forth, modes of operation and advantages of apparatus 10 can be explained. Generally, product is fed in a random basis to meter conveyor 12 where it accumulates. In particular, meter conveyor 12 preferably runs constantly but possibly at variable speed, and product is conveyed or pushed thereon. Products can be accumulated on and are conveyed by conveyor 12 as a continuous stream in multiple columns extending laterally across the streams and rows extending longitudinally along the stream or as a lane including a single column and multiple rows in a conveying direction at a first conveyance speed. Additionally, product can have a variety of shapes such as circular or rectangular cross sections. In particular, product can accumulate in a nested manner in the continuous stream on meter conveyor 12 such as in the case of circular cross sections. Nesting of products is very beneficial in apparatus 10 according to the teachings of the present invention as nesting and the lack of physical registration vastly minimizes product surge or in other words the high-pressure effect of one product pushing against another at the point of product release onto transfer device 42.

Products can also accumulate in a non-nested array manner in a single column or lane or in multiple columns. As an example, although the first product conveyance mechanism is shown in the preferred form as a single conveyor 12 in the preferred form, the first product conveyance mechanism could be in the form of parallel, multiple conveyors 12, each conveying a continuous stream of product. Alternatively, the first product conveyance mechanism can be in the form of a single conveyor 12 but with individual lane separator guides being placed over conveyor 12, with such individual lane separator guides being installed permanently or removable and/or adjustable such as by simply being slid to the side for convenient storage for use when desired.

For the sake of explanation, it will be assumed that device 42 is in its retracted position and product has been advanced by metering conveyor 12 to the free edge of second support 42B. Device 42 is moved from its retracted position to its extended position such as by moving gear belts 106 and 206 such that first and second supports 42A and 42B move in the conveying direction of conveyor 22 in the most preferred form at a speed which is less than the speed of conveyor 22. Simultaneously, while device 42 is moving to its extended position, meter conveyor 12 is actuated to move belt 14 to push and thereby transfer product from belt 14 onto transfer plate 32 and onto first support 42A. Since second support 42B is moving from the retracted position faster than first support 42A, a gap is created between product supported upon second support 42B and the leading edge of first support 42A.

After a gap is created, a pair of metering bars 52A and 52B are simultaneously introduced in an introduction position of the endless path of transmission devices 52Aa and 52Ba into the gap, with first and second bars 52A and 52B being closely adjacent and having an extent in the conveying direction less than the gap. After introduction, metering bars 52A and 52B move from the introduction position to a metering position of the endless path of transmission devices 52Aa and 52Ba. Specifically, bar 52B is slowed such that the leading edge of product upon support 42A engages with bar 52B, with bar 52B moving in the conveying direction initially to match the conveying speed of conveyor 12 in the most preferred form. Also, after introduction, bar 52A is accelerated to engage with the trailing edge of product upon support 42B. Thus, the extent of metering bars 52A and 52B in the conveying direction is less in the introduction position than in the metering position. It should be appreciated that as support 42B is accelerated to create the gap, bar 52B of the previous cycle is simultaneously accelerated to maintain contact with the product upon support 42B. After bar 52A engages with the trailing edge of product upon support 42B, bar 52A engaging with the trailing edge and bar 52B engaging the leading edge are simultaneously accelerated to match the conveying speed of conveyor 22. While metering bars 52A and 52B are being accelerated to match the conveying speed of conveyor 22, transfer device 42 is retracted and moves opposite to the conveying direction such that product previously on support 42B are deposited upon conveyor 22 traveling at the conveying speed of conveyor 22. It should also be appreciated that metering bar 52A contains the pattern and positively positions the product pattern on conveyor 22.

As transfer device 42 is being retracted, the product is removed from support 42A by sliding from support 42A onto support 42B as the upstream product on conveyor 12 and transfer plate 32 abut with the continuous stream of product upon support 42A and thereby prevent product on support 42A from moving in an upstream direction with support 42A as transfer device 42 moves from the extended position to its retracted position. It should be noted that the distance moved should generally be equal to the length of the desired product pattern and specifically a distance so that the last product(s) in the desired group of product are located sufficiently upon support 42B such that they will travel with support 42B and thereby are repositioned relative to support 42A by support 42B. It should be appreciated that the leading edge of support 42A should be located between product groups such as electronically by controlling transfer by meter conveyor 12 and/or by controlling drive 100 on the amount that support 42A is moved. It should be appreciated that bar 52B prevents tipping of product unto support 42B when transfer device 42 is retracted to deposit product upon support 42B as well as when transfer device 42 moves from its retracted position.

It should be appreciated that product generally is in the same relationship in the group as in the continuous stream. Specifically, there is generally no separation of product in a direction perpendicular to the conveying direction or in other words between the columns and rows. Such separation occurs in prior pin metering apparatus which requires further alignment or railing to get into a compact group. Apparatus 10 according to the preferred teachings of the present invention releases product onto conveyor 22 in a compact group, eliminating the need for further railing. Additionally, an added benefit is that product in groups seem to be more stable than when product stands individually on conveyor 22. Further, transfer device 42 according to the preferred teachings of the present invention is independently driven from conveyor 22 which is advantageous as undesired slippage of the transfer device relative to the conveyor in prior apparatus could result in the transfer device not reaching the desired extended position. Further, since movement of transfer device 42 is not dependent upon friction with the conveyor 22 or between supports 42A and 42B in the preferred form, transfer device 42 can be formed of more slippery material which takes less energy to move from the extended position to the retracted position and which allows product to more readily slide onto and from transfer device 42 according to the teachings of the present invention.

After product transfer device 42 has reached its retracted position, this operation is repeated. In the most preferred form, sweep conveyor 22 is moving in the same conveying direction as but at a higher velocity than meter conveyor 12 such that the product pattern is accelerated when moved from device 42 onto sweep conveyor 22 to create the physical separation between the product patterns and the contiguous stream of products on meter conveyor 12. This is beneficial as the velocity of meter conveyor 12 can approach being constant if device 42 can be moved from its extended position to its retracted position and again move towards its extended position as the leading product(s) in the continuous stream of product pass from transfer plate 32 after the previous product has passed onto belt 24.

Once product groups have been placed onto sweep conveyor 22 with physical separations between them, the product in the groups can be collected together and placed in a desired pack pattern, if not already so, such as by the use of sweep bar mechanism 62 and such as but not limited to shrink-packing (film only, film and pad, and/or film and tray), tray loading, cartoning, sleeving or case packing.

It should be appreciated that apparatus 10 according to the teachings of the present invention is advantageous for several reasons. First, it is not necessary for the product to have windows between them in the continuous stream as was necessary with pin type metering. Particularly, apparatus 10 of the present invention can be utilized with product which have windows such as but not limited to cylindrical product, such as but not limited to cans, plastic bottles, and jars, product which do not have windows such as but not limited to rectangular parallelepipeds, such as in cartons and boxes, as well as product in the form of bundles or trays. Thus, apparatus 10 is able to function with many types of product.

In this regard, it may be desired to manufacture support 42A to have a leading edge which is scalloped to have a shape representing the actual shape of the leading bottom edges of the nested pattern of product to be appropriately deposited onto support 42B, with the leading bottom edge of product not being linearly straight such as being circular as in the case of many cans, bottles, jars or the like. The advantage of such a scalloped shape is that the leading edge follows the following edge of the last row of the product group and the leading edge of the continuous stream as the following edge has a forward extent forward of the rearward extent of the leading edge due to the nested arrangement which could result in product being haphazardly released from or carried by support 42A if its leading edge were not scalloped. Although it would be necessary to have support 42A scalloped to each of the potential nested patterns of products desired to be metered, support 42A can be a replacement part which is especially inexpensive when formed of belting or similar thin, flexible material. Additionally, leading edge of support 42A could have other shapes to help removal of product as support 42A moves from its extended position.

Likewise, to change over to product groups having different group depths such as to change between groups having different product sizes or groups having a different number of rows, it is only necessary to adjust the distance that device 42 moves between its extended and retracted position such as by changing the controls to drive 100 in the preferred form, to attach device 42 at a different length to gear belts 106 and 206, or to utilize a different device 42 which can be a relatively inexpensive replacement part. Thus, apparatus 10 according to the teachings of the present invention can be rapidly changed between product and pack pattern type and size.

As can be appreciated, a major desire in the field is product throughput. Prior apparatus including but not limited to U.S. Pat. No. 6,843,360 included a transfer device formed by a single element where the product is transferred from that single element directly onto the sweep conveyor. The limiting factor on speed of such prior apparatus is often the amount of friction between the sweep conveyor and the product. Since the sweep conveyor is initially traveling faster than the product, the acting force that pulls the product to move with the sweep conveyor is kinetic friction. According to the preferred teachings of the present invention, the coefficient of friction of supports 42A and 42B is higher than that of belt 24 of sweep conveyor 22. The acting friction on the bottom of the product for metering in apparatus 10 of the present invention is static friction, which is always greater than kinetic friction. This greater friction allows faster metering speeds according to the preferred teachings of the present invention. The faster metering speeds of the present invention is one of the reasons that metering bars 52B are utilized in the preferred form shown according to the teachings of the present invention.

It should be appreciated that apparatus 10 according to the teachings of the present invention is formed of relatively few moving parts, and the only part which would be subjected to wear is device 42, which in the preferred form is a relatively inexpensive replacement part. In particular, conveyors 12 and 22 and metering bar mechanism 52, if utilized, are low wear and maintenance especially in comparison to the pin metering conveying mechanisms. Additionally, product is open from the top and generally open from the sides during the metering function of apparatus 10 according to the teachings of the present invention to allow easy access to product on conveyor 12 and/or 22. Likewise, apparatus 10 only requires drive 100 in the preferred form within conveyor 22 (and servo motors to the side) for easy access to the bottom for maintenance and cleaning.

In the most preferred form, conveyor 22 moves at a higher velocity than conveyor 12 so that the product group accelerates from the continuous stream once they are supported directly on conveyor 22. This is advantageous because conveyor 12 can continuously operate without stopping even during the removal of product from transfer device 42 by moving in a direction opposite to the conveying direction of conveyor 12. However, it is possible to have conveyor 12 surge in velocity to transfer product onto device 42 and then decelerate to cause the separation between the metered product group and the continuous stream of product. Likewise, separation could be caused by other techniques including but not limited to combinations of the above.

As set forth previously, apparatus 10 according to the teachings of the present invention allows nesting in the continuous stream which is very desirable. Thus, when separated into groups, product will be nested or will not be in the same physical relationships to each other as when they were in the continuous stream as variations in slippage between individual product in the group and conveyor 22. However, many packaging operations require the product group to be in an arranged pack pattern. According to the teachings of the present invention, metering bars 52B travel at a velocity slower than conveyor 22 and are in front of the product group to thereby limit acceleration of product. As a result, the product in group will slide on conveyor 22 (possibly with the help of side rails) relative to each other so that they will be located in an arranged pack pattern suitable for further packaging functions when engaged by sweep bars 62a.

Now that the basic teachings of the present invention have been explained, many extensions and variations will be obvious to one having ordinary skill in the art. For example, although apparatus 10 of the most preferred form includes the combination of several, unique features believed to obtain synergistic results, apparatus could be constructed according to the teachings of the present invention including such features singly or in other combinations.

Additionally, it can be appreciated that conveyor 22 could be arranged to receive a tray or a pad before transfer device 42 is extended thereover or product transferred onto conveyor 22 according to the teachings of the present invention.

The function of plate 32 is to allow product to be transferred from conveyor 12 to conveyor 22. However, it can be appreciated that this function can be accomplished in other manners as well known in the packaging art including but not limited to by the use of roller mechanisms, reshaping conveyors 12 and/or 22, or by utilizing other manners of product conveyance mechanisms. As an example, another possibility is using a moving conveyor transfer that consists of the tail shaft of sweep conveyor 22 and the head shaft of meter conveyor 12 having a fixed relationship to each other and which can laterally position itself (such as via a servo motor) underneath the appropriate product separation point and then in combination with metering bars 52A and 52B advance the desired arrangement of product to conveyor 22.

Although metering bar mechanism 52 and sweep bar mechanism 62 are separately provided in the preferred form shown which provides advantages including higher speed operation, greater flexibility to allow apparatus 10 to meter product of varying configurations and types, ease of operation control and the like, mechanisms 52 and 62 could be incorporated in a single mechanism with metering bars 52B providing the function and result of sweep bars 62a according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Apparatus for metering product comprising, in combination: a conveyor having an upstream end and a downstream end and including an upper run moving from the upstream end to the downstream end in a conveying direction and a lower run moving from the downstream end to the upstream end; a transfer device moveable relative to the conveyor between an extended position and a retracted position, with the transfer device comprising a first support having a leading end and a second support having a leading end, with the second support intermediate the first support and the upper run of the conveyor, with the leading end of the first support being intermediate the upstream end and the leading end of the second support, with the leading ends of the first and second supports located in the conveying direction at a greater spacing from the upstream end in the extended position than in the retracted position, with the leading end of the second support being spaced in the conveying direction from the leading end of the first support in the retracted position for a length generally equal to the product in the conveying direction, with the leading end of the second support being spaced in the conveying direction from the leading end of the first support in the extended position greater than the length to define a gap downstream of the leading edge of the first support, with the transfer device moving from the extended position to the retracted position opposite to the conveying direction.

2. The apparatus of claim 1 further comprising, in combination: first and second metering bars moveable between an introduction position and a metering position, with the first and second metering bars having an extent in the conveying direction, with the extent of the metering bars in the introduction position being less than the gap and less than the extent of the metering bars in the metering position.

3. The apparatus of claim 2 further comprising, in combination: first and second, flexible, metering transmission devices parallel to the conveying direction, with the conveyor located intermediate the first and second, flexible, metering transmission devices, with the first metering bar secured to and extending between the first and second, flexible, metering transmission devices; and third and fourth, flexible, metering transmission devices parallel to the conveying direction, with the conveyor located intermediate the third and fourth, flexible, metering transmission devices, with the second metering bar secured to and extending between the third and fourth, flexible, metering transmission devices.

4. The apparatus of claim 3 further comprising, in combination: a plurality of axles each defining an axis, with each axle including first and second metering pulleys rotatable about the axis and receiving the first and second, flexible metering transmission devices, with the conveyor located intermediate the first and second metering pulleys, with each axle further including third and fourth metering pulleys rotatable about the axis and receiving the third and fourth, flexible, metering transmission devices, with the conveyor located intermediate the third and fourth metering pulleys.

5. The apparatus of claim 1 wherein the conveyor includes first and second longitudinal sides extending parallel to the conveying direction; and with the apparatus further comprising, in combination: a drive secured to the first support at first and second leading points adjacent to the leading end of the first support and secured at first and second leading points adjacent to the leading end of the second support, with the first and second longitudinal sides being intermediate the first and second leading points of the first support and being intermediate the first and second leading points of the second support.

6. The apparatus of claim 5 wherein the first and second supports each include a trailing end, with the drive secured to the first support at first and second trailing points adjacent to the trailing end of the first support, with the drive secured to the second support at first and second trailing points adjacent to the trailing end of the second support.

7. The apparatus of claim 6 wherein the drive includes first, second, third and fourth flexible belts parallel to the conveying direction, with the first leading and trailing points of the first support being on the first flexible belt, with the second leading and trailing points of the first support being on the second flexible belt, with the first leading and trailing points of the second support being on the third flexible belt, and with the second leading and trailing points of the second support being on the fourth flexible belt.

8. The apparatus of claim 7 wherein the first, second, third and fourth flexible belts are each arranged along an endless course.

9. The apparatus of claim 7 further comprising, in combination: first and second shafts extending between the upper and lower runs, with the first and second flexible belts extending around the first shaft, with the third and fourth belts extending around the second shaft, with the upstream end and the first and second shafts being spaced and parallel, with the first shaft being intermediate the upstream end and the second shaft.

10. The apparatus of claim 2 further comprising, in combination: a sweep bar moving independently from the first and second metering bars.

11. The apparatus of claim 1 wherein each of the first and second supports is in the form of a thin piece of flexible material.

12. Method for metering product comprising:
transferring products in a continuous stream unto first and second supports in a retracted position, with each of the first and second supports having a leading end, with the leading end of the second support being spaced a length in a conveying direction of one of the products from the leading end of the first support in the retracted position;
moving the first and second supports from the retracted position in the conveying direction with the second support moving faster than the first support to create a gap between the one of the products on the second support and the leading end of the first support;
moving the first and second supports opposite to the conveying direction after the gap is created and to the retracted position with the second support moving faster than the first support, with moving the first and second supports opposite to the conveying direction including transferring the one of the products from the second support unto a conveyor and transferring another of the products from the first support onto the second support; and
conveying the transferred one of the products in the conveying direction on the conveyor.

13. Method of claim 12 further comprising:
simultaneously introducing first and second metering bars into the gap before the first and second supports move opposite to the conveying direction;
abutting the introduced second metering bar with a leading edge of the products located on the first support while the first and second supports move opposite to the conveying direction; and
abutting the introduced first metering bar with a trailing edge of the one of the products on the second support while the first and second supports move opposite to the conveying direction.

14. The method of claim 13 wherein simultaneously introducing the first and second metering bars comprises:

moving first and second, flexible, metering transmission devices parallel to the conveying direction, with the product located intermediate the first and second, flexible, metering transmission devices, with the first metering bar secured to and extending between the first and second, flexible, metering transmission devices; and moving third and fourth, flexible, metering transmission devices parallel to the conveying direction, with the product located intermediate the third and fourth, flexible, metering transmission devices, with the second metering bar secured to and extending between the third and fourth, flexible, metering transmission devices.

15. The method of claim 14 further comprising:

providing a plurality of axles each defining an axis, with each axle including first and second metering pulleys rotatable about the axis and receiving the first and second, flexible metering transmission devices, with the conveyor located intermediate the first and second metering pulleys, with each axle further including third and fourth metering pulleys rotatable about the axis and receiving the third and fourth, flexible, metering transmission devices, with the conveyor located intermediate the third and fourth metering pulleys.

16. The method of claim 14 wherein moving the first and second supports comprises moving a drive secured to the first support at first and second leading points adjacent the leading end of the first support and secured at first and second leading points adjacent the leading end of the second support, with the conveyor including first and second longitudinal sides extending parallel to the conveying direction, with the first and second longitudinal sides being intermediate the first and second leading points of the first support and being intermediate the first and second leading points of the second support.

17. The method of claim 16 wherein moving the drive comprises moving the drive secured to the first support at first and second trailing points adjacent a trailing end of the first support and secured to the second support at first and second trailing points adjacent a trailing end of the second support.

18. The method of claim 16 wherein moving the drive comprises moving first, second, third and fourth flexible belts parallel to the conveying direction, with the first leading and trailing points of the first support being on the first flexible belt and with the second leading and trailing points of the first support being on the second flexible belt, with the first leading and trailing points of the second support being on the third flexible belt, and with the second leading and trailing points of the second support being on the fourth flexible belt.

19. The method of claim 18 wherein moving the first, second, third and fourth flexible belts comprises moving the first, second, third and fourth flexible belts along an endless course.

20. The method of claim 18 wherein moving the first, second, third and fourth flexible belts comprises moving the first and second flexible belts around a first shaft and moving the third and fourth flexible belts around a second shaft spaced in the conveying direction from and parallel to the first shaft.

21. The method of claim 12 further comprising:

abutting the trailing edge of the transferred one of the product being conveyed with a sweep bar.

22. The method of claim 12 with moving the first and second supports comprising moving the first and second supports each in the form of a thin piece of flexible material.

\* \* \* \* \*